Patented July 5, 1938

2,122,601

UNITED STATES PATENT OFFICE 2,122,601

VAT DYESTUFFS OF THE ANTHRAQUINONE SERIES

Fritz Baumann, Leverkusen I. G.-Werk, Germany, assignor to General Aniline Works, Inc., New York, N. Y., a corporation of Delaware No Drawing. Application August 23, 1935, Serial No. 37,601. In Germany August 29, 1934

3 Claims. (Cl. 260—59)

The present invention relates to new anthraquinone derivatives.

I have found that new and valuable anthraquinone derivatives are obtained by causing halogen alkyl sulfonic acids to react upon mercapto anthraquinones. The new compounds which are obtainable thereby and which are the object of my present invention may be defined as "anthraquinonyl-alkyl-thioethers, wherein the alkyl residues bear sulfonic acid groups". These anthraquinone derivatives are water soluble products and can be used for directly dyeing animal fibers or as intermediates for the preparation of dyestuffs. The new dyestuffs show a yellow to black coloration and represent in form of the alkali metal salts well crystallized compounds, which dissolve in water either with yellow, violet or blue to gray coloration and dye wool from an acid bath the same shades. The dyestuffs show good equalizing properties. Obviously, the anthraquinone nucleus may contain various substituents without departing from the sense of my invention. Of particular importance are such compounds as contain besides the sulfur containing group in one β-position halogen atoms in the other β-position of the same nucleus and amino groups in 1- or 4-position of the same nucleus, examples for such starting materials are, for instance, 1-amino-2-mercapto-4-aminoanthraquinones, the 4-amino group of which contains substituents like the benzene, toluene, hexahydrobenzene or other aromatic or hydroaromatic residues. Furthermore, my invention is not restricted to the presence of only one sulfur containing group of the character described, derivatives of polymercaptoanthraquinones, such as of a 2.3-dimercaptoanthraquinone being included within the scope of my claims. Examples of other suitable starting materials are, for instance, 1-mercaptoanthraquinone, 1-amino-2-mercaptoanthraquinone, 1.4-diamino-2-chloro-3-mercaptoanthraquinone, 4.4'-diamino-3.3'-dimercapto-1.1'-dianthraquinonylamines, 1-amino-2-mercapto-4-arylidoanthraquinone-6-sulfonic acids, 1-amino-2-mercaptoanthraquinone-4-arylido sulfonic acids (i. e. compounds which contain a sulfonic acid group in the aryl residue which is attached to the nitrogen), furthermore, 1-amino-2-mercapto-6- or 7-chloroanthraquinones and the like. Suitable halogen alkyl sulfonic acids are, for instance, chloroethane sulfonic acid, hydroxychloropropane sulfonic acid and β-chlorodiethylether-β'-sulfonic acid, it being understood that derivatives of lower alkyl groups are preferably employed for my invention.

The reaction is performed in an aqueous solution or in dilute alcoholic solution at a temperature of about 50 to about 100° C. In case the mercaptane in question which serves as starting material has not been applied in form of an inorganic salt from the very beginning, caustic alkalies, alkali carbonate and the like may be added as acid binding agents. The water soluble thioethers may be isolated in the usual manner, for instance, by salting out.

The following examples will illustrate the invention, without, however, restricting it thereto, the parts being by weight:—

Example 1

30 parts of 1-mercaptoanthraquinone are dissolved while heating in 800 parts of an aqueous alcohol of 50% strength with the addition of 40 parts of a 30% aqueous sodium lye. Into the clear, reddish-violet mercaptane solution, 50 parts of the sodium salt of chloroethane sulfonic acid are introduced and the mixture is heated to boiling, until the reddish-violet coloration of the solution has turned to brown.

The working up is performed by acidifying the reaction mass, the disulfide formed as by-product and the starting material are filtered off and from the filtrate the sulfonic acid formed is isolated by salting out in form of its potassium salt by means of potassium chloride. Similar results are obtained by replacing the chloroethane sulfonic acid by the corresponding amount of the β-chlorodiethylether-β'-sulfonic acid.

Example 2

7.2 parts of 1-amino-2-mercapto-4-para-toluidoanthraquinone (obtainable from 1-amino-2-bromo-4-para-toluidoanthraquinone by a treatment with sodium sulfide) are dissolved in 60 parts of ethanol, 150 parts of water and with the addition of 6 parts of a 30% caustic soda solution, whereupon the disulfide, which might be present, is filtered off. The bluish-violet solution is heated to boiling for some hours while refluxing after the addition of 12 parts of chloroethane sulfonic acid (sodium salt). Most part of the reaction product crystallizes while heating, and may be directly sucked off when the reaction is finished. The bluish-green dyestuff being difficultly soluble in water may be obtained by recrystallization from aqueous methanol in an absolutely pure state. It dyes wool from an acid bath greenish blue shades of excellent fastness properties.

In a similar manner the 1-amino-2-bromo-4-toluidoanthraquinone sulfonic acid after conversion into the corresponding 2-mercapto compound may be reacted upon with chloroethane sulfonic acid. The compound thus obtained is of an improved solubility when compared with the product described before.

When using instead of the 1-amino-2-mercapto-4-toluidoanthraquinone the sodium salt of -amino-2-mercapto-4-hexa-hydroanilidoanthraquinone in an aqueous alcohol of 50% strength and applying an excess of chloroethane sulfonic acid, an analogous dyestuff is obtained which corresponds to the following formula:

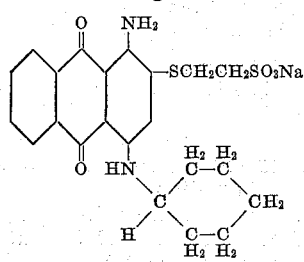

It dyes more reddish and clearer shades than the dyestuff mentioned above.

*Example 3*

30 parts of the sodium salt of 1,4-diamino-2-chloro-3-mercaptoanthraquinone, which may be obtained by a reaction of molecular amounts of sodium sulfide and 1,4-diamino-2,3-dichloroanthraquinone, are heated to boiling while stirring with 500 parts of aqueous ethanol of 50% strength and 40 parts of the sodium salt of chloroethane sulfonic acid, until the presence of mercapto groups can no longer be observed. After cooling the separated dyestuff is sucked off. For purification the starting material is once more redissolved from water and salted out by the addition of common salt in form of its bluish violet sodium salt.

Wool is dyed clear bluish-violet shades of good equalizing properties and good fastness to light.

A more bluish dyestuff is obtained by causing sulfite to react upon the compound obtained the chlorine being replaced by the sulfonic acid group.

*Example 4*

15 parts of the sodium salt of 1,4-diamino-2,3-dimercaptoanthraquinone (obtainable from 1,4-diamino-2,3-dichloroanthraquinone by the action of an excess of sodium sulfide) are heated for some hours to boiling while refluxing with 30 parts of the sodium salt of chloroethane sulfonic acid and 3 parts of sodium bicarbonate in 300 parts of aqueous ethanol. The reaction product is sucked off after cooling. The dyestuff may be recrystallized from pyridine water. In a dry state it represents a blue crystalline powder and dyes wool from an acid bath blue shades.

*Example 5*

When brominating the 4,4'-diamino-1,1'-dianthrimide in nitrobenzene, two bromine atoms are absorbed; by melting this product with sodium sulfide a dimercaptane is obtained which is assumed to be the 4,4'-diamino-3,3'-dimercapto-1,1'-dianthraquinonylamine.

When treating the alkaline solution of the mercaptane thus obtained with an excess of chloroethane sulfonic acid in the manner described, a greenish-gray dyestuff is obtained which is relatively difficultly soluble in water. Wool is dyed grey shades of good fastness properties.

I claim:—

1. The compounds of the following formula

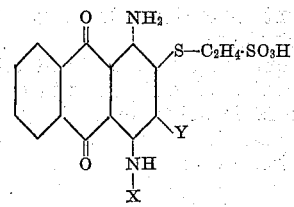

wherein X represents a member of the group consisting of hydrogen, aryl and hydroaryl, and wherein Y represents a member of the group consisting of hydrogen and chlorine.

2. The product of the following formula:

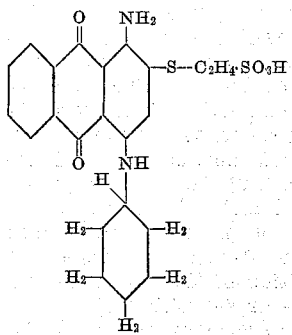

3. The product of the following formula:

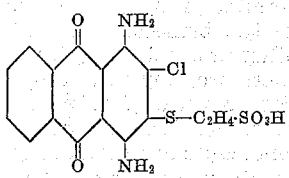

FRITZ BAUMANN.